Sept. 9, 1947.   H. A. KNOX   2,427,006
VEHICLE SUSPENSION
Filed June 21, 1944   5 Sheets-Sheet 1
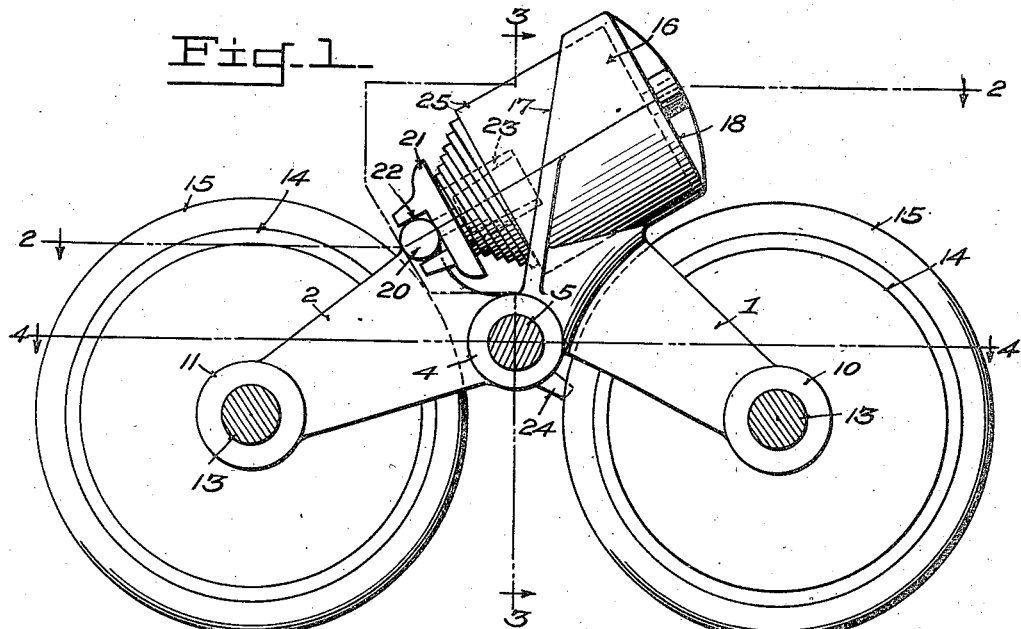
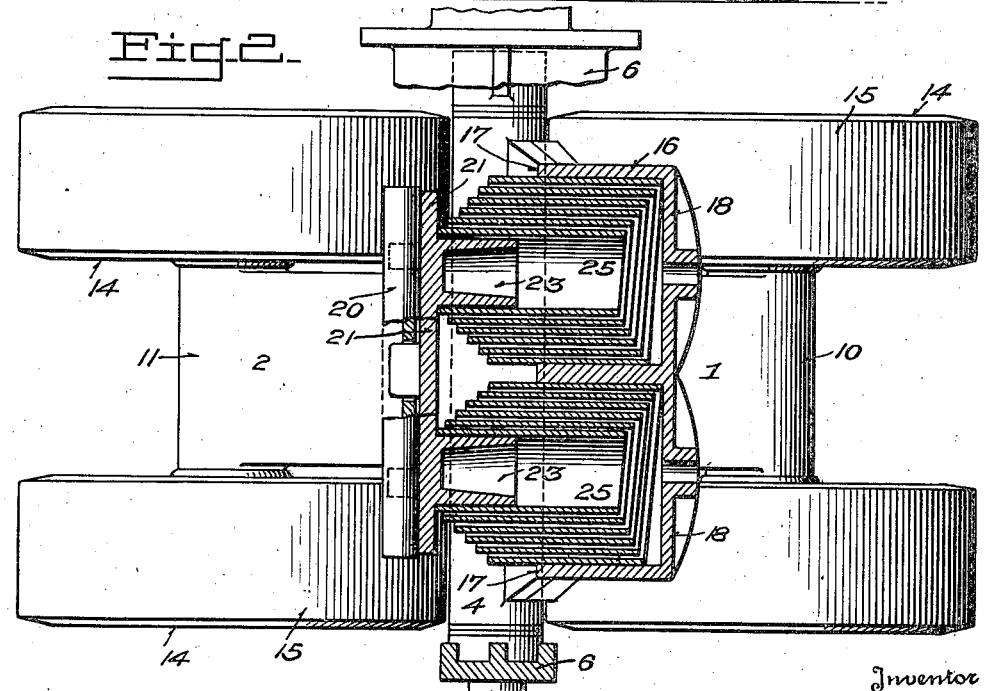
Inventor
HARRY A. KNOX,
By C. E. Herrstrom & H. E. Thibodeau
Attorneys Sept. 9, 1947.  H. A. KNOX  2,427,006
VEHICLE SUSPENSION
Filed June 21, 1944  5 Sheets-Sheet 2
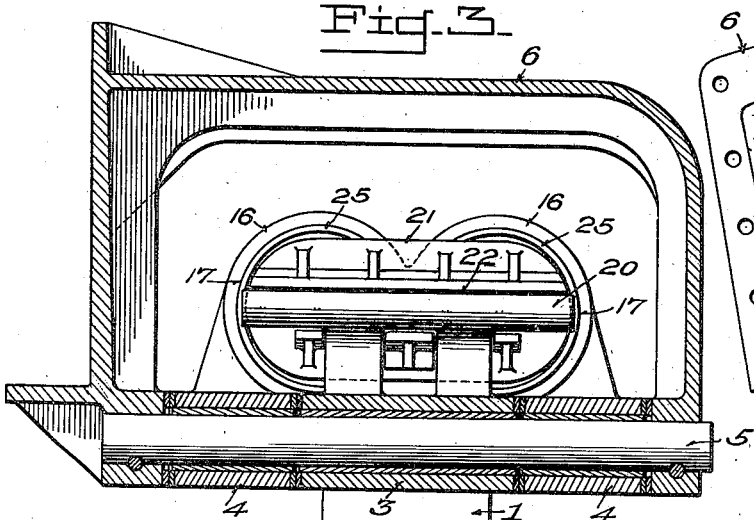
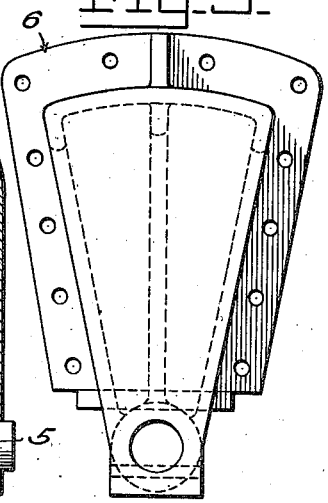
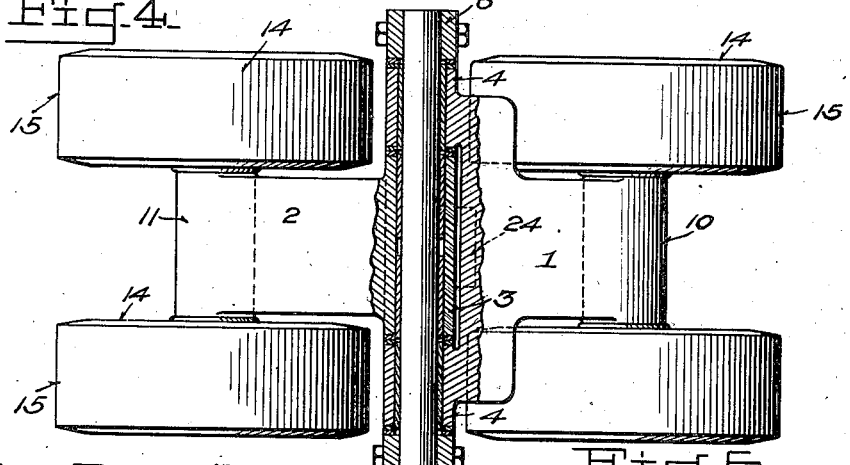
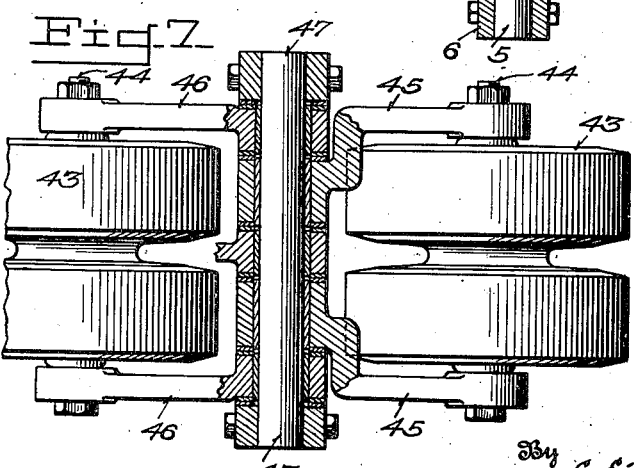
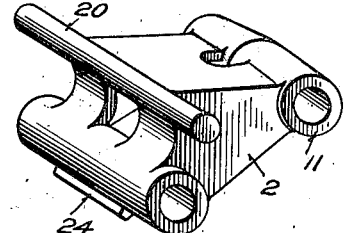
Inventor
HARRY A. KNOX,
By C. E. Herrstrom & W. E. Thibodeau
Attorneys

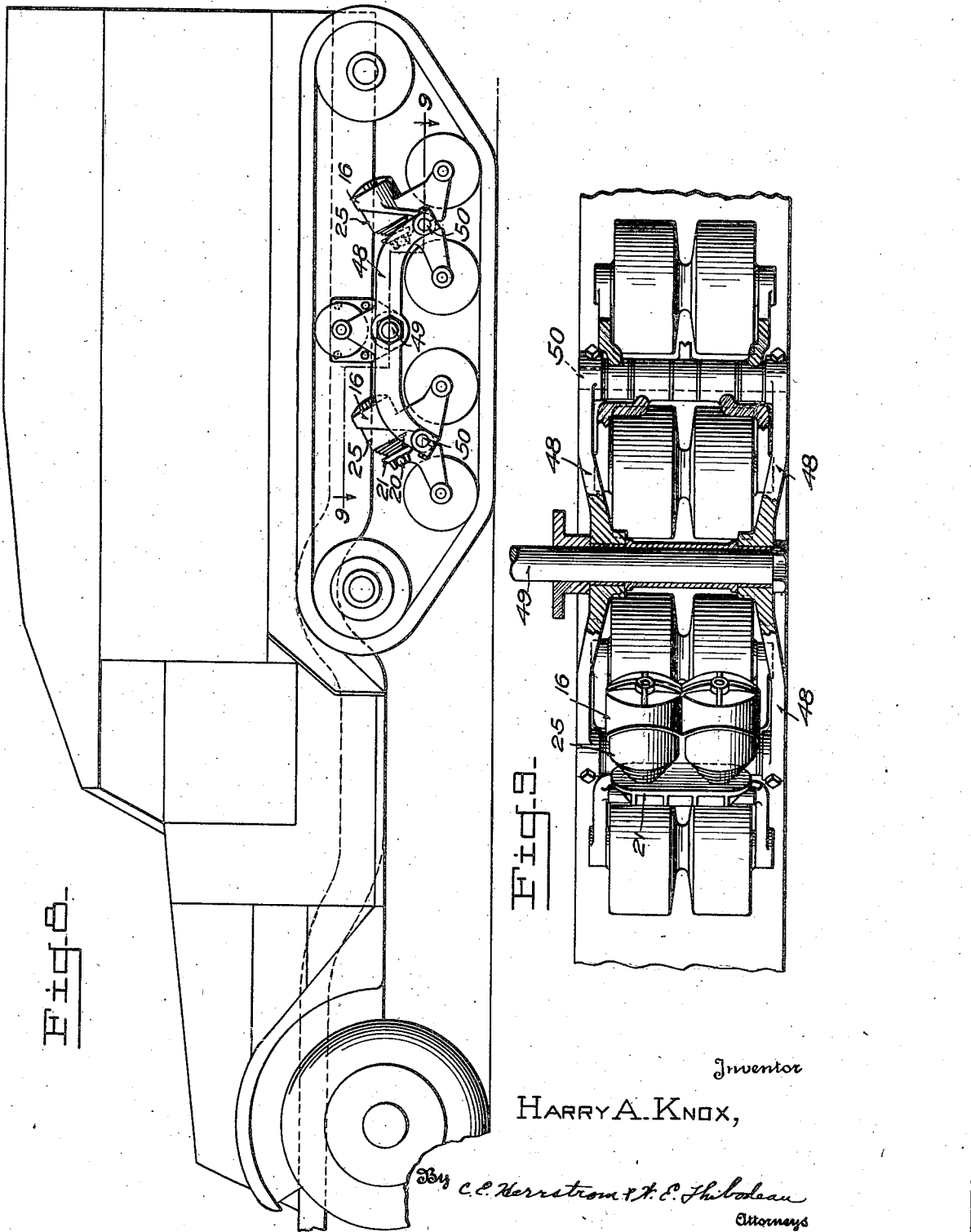

Sept. 9, 1947.     H. A. KNOX     2,427,006
VEHICLE SUSPENSION
Filed June 21, 1944     5 Sheets-Sheet 4
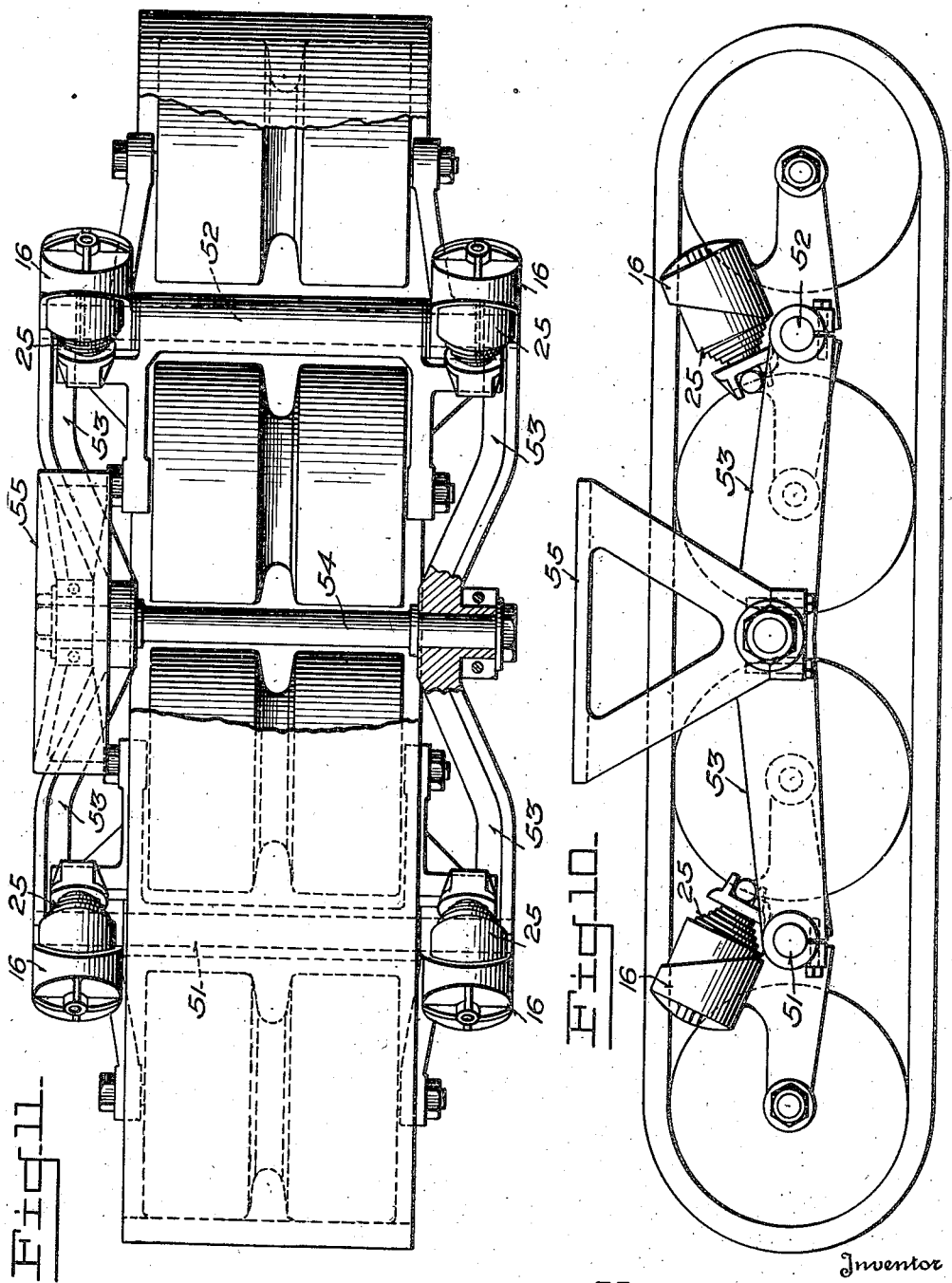
Inventor
Harry A. Knox, Sept. 9, 1947.  H. A. KNOX  2,427,006
VEHICLE SUSPENSION
Filed June 21, 1944   5 Sheets-Sheet 5
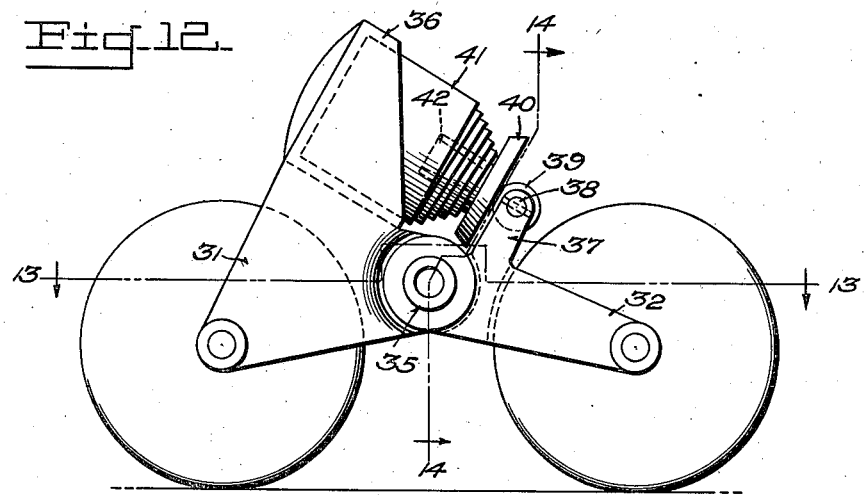
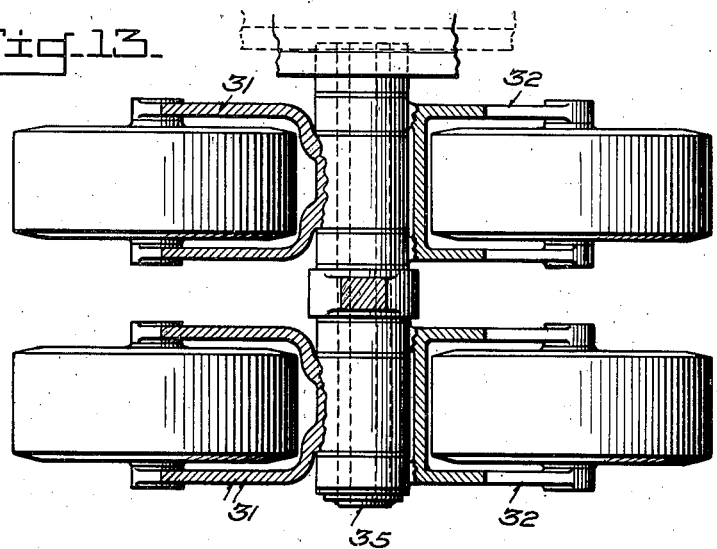
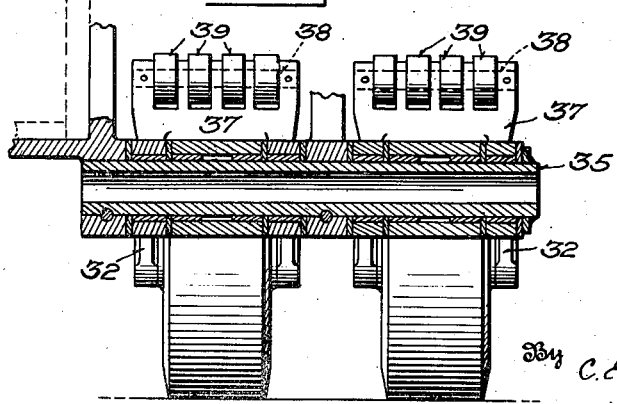
Inventor
HARRY A. KNOX,
By C. E. Herrstrom & W. E. Thibodeau
Attorneys Patented Sept. 9, 1947

2,427,006

UNITED STATES PATENT OFFICE 2,427,006

VEHICLE SUSPENSION

Harry A. Knox, Washington, D. C.

Application June 21, 1944, Serial No. 541,408

5 Claims. (Cl. 267—20)

(Granted under the act of March 3, 1883, as amended April 30, 1928; 370 O. G. 757)

The invention described herein may be manufactured and used by or for the Government for governmental purposes without the payment to me of any royalty thereon.

The present invention pertains to a novel vehicle suspension of the type shown in my United States Patent No. 2,333,107 of Nov. 2, 1943.

The principal object of the invention is to reduce the overall length of the suspension, thereby permitting the use of more suspension units and more wheels than formerly in a given length. The result of the increased number of suspension units and wheels in a given length is a smoother riding vehicle and lower unit pressure on the wheels. If the suspension units are used as bogies in a track-laying vehicle, there is less unit pressure on the track under the wheels.

In reducing the overall length of the unit, the spring embodied therein is mounted with its axis at an acute angle to the ground. This arrangement constitutes another novel feature of the invention whereby the spring readily releases any water, mud or sand that may be temporarily lodged therein.

Another object of the invention is to simplify the construction by eliminating one of the bearings between the spring seats and the arms with which the seats are associated. The device consists essentially of a pair of wheel-carrying arms mounted for pivotal movement and each carrying a seat for one end of the spring. It has heretofore been considered necessary to mount each such seat to move relatively to its arm. I have found that one of the seats, particularly that for the larger end of a volute spring, may be carried rigidly by its arm, whereby the usual bearing between this seat and the arm is eliminated.

Another simplification consists in mounting the arms on a common axis of articulation, whereas my prior patent shows a distinct axis for each arm. The novel construction, in addition to being simpler, contributes further to the reduction in the overall length of the suspension.

An illustrative embodiment of the invention is disclosed by way of example in the following description and in the accompanying drawings in which:

Figure 1 is a side elevation of the device, partly in section.

Figure 2 is a horizontal section taken substantially on the plane indicated by the line 2—2 of Figure 1.

Figure 3 is a vertical section taken substantially on the plane indicated by the line 3—3 of Figure 1.

Figure 4 is a horizontal section taken substantially on the plane indicated by the line 4—4 of Figure 1.

Figure 5 is an end elevation of the structure shown in Figure 3.

Figure 6 is a perspective view of one of the housing arms.

Figure 7 is a horizontal section similar to Figure 4 but showing a modified structure.

Figure 8 is a side elevation of a vehicle of the half-track type and including the structure of the present invention.

Figure 9 is a horizontal section taken substantially on the plane indicated by the line 9—9 of Figure 8.

Figure 10 is a side elevation of the device applied to another type of vehicle.

Figure 11 is a horizontal plan view, partly broken away, of the structure shown in Figure 10.

Figure 12 is a side elevation, similar to Figure 1, but illustrating a modification.

Figure 13 is a horizontal section taken substantially on the plane indicated by the line 13—13 of Figure 12.

Figure 14 is a vertical section taken substantially on the plane indicated by the line 14—14 of Figure 12.

The suspension includes a housing arm 1 and a companion arm 2 adapted to be hingedly attached to one another as will presently be shown. The arm 2 is formed with a bearing 3 adapted to be inserted in and alined with a forked bearing 4 formed on the arm 1. A shaft 5 is passed through the alined bearings and journalled therein in any suitable manner. The shaft 5 has one or both ends journalled in a suitable bearing bracket 6 adapted to be secured to the frame or hull of the vehicle as well known in the art.

The outer or free ends of the arms 1 and 2 are formed as bearings 10 and 11 respectively. Through each such bearing is passed an axle 13 projecting beyond both ends of the bearing and carrying dual wheels 14 which are preferably fitted with solid tires 15.

The upper end of the arm 1 is formed with a pair of spring seats or housings 16, each having an open end 17 facing a wheel carried by the arm 2 and having its other end closed at 18. The interior of each housing is a portion of a cylinder having its axis disposed at about 30 degrees to the ground or to a line connecting the centers of the bearings 10 and 11. The housings are in lateral alinement as may be seen in Figure 2.

The arm 2 is formed with a cross pin 20 disposed above the line of the centers of the bearings 3, 11 and between those centers. The pin cooperates with a spring seat 21 having a channel 22 receiving the pin and having a pair of pilot studs 23, Figure 2, lying axially of the housings 16 for a purpose that will presently be described. The arm 2 is also formed with a stop lug 24 at its bearing 3 to limit the converging movement of the arms 1 and 2.

Each spring housing 16 receives the larger end of a volute spring 25 formed of band or flat stock. The smaller end of each spring lies outside of its housing and bears against the seat 21, receiving one of the pilot studs 23.

It is now evident that divergent motion of the arms 1, 2 caused by irregularities in the ground surface is resisted and absorbed by the volute springs 25. The angular position of the springs, as distinguished from the horizontal position shown in the prior patent, effects an economy of space lengthwise of the vehicle. A reduction in the overall lengthwise dimension is also obtained by the single connecting shaft 5 which replaces the two shafts shown in the patent for connecting the arms to the vehicle. As a result of these economies, a greater number of units can be mounted in a given length than formerly, and a smoother riding vehicle is thereby obtained. The formation of the spring housing 16 as an integral part of the arm 1 eliminates the bearing which was formerly considered necessary between these parts and which is shown in the aforementioned patent. Another advantage of the angular spring is that it readily allows any water, mud or sand to drain or shake out from between the spring coils. The reduced overall lengthened unit permits about 33% more bogies wheels and springs in a given length, with better spacing of the bogies wheels and lower unit pressure on the rubber tires and on the track under the wheels.

Figure 7 illustrates a slightly modified structure in which the dual wheels 43 are carried by axles 44 journalled in the bifurcated arms 45 and 46, the latter being pivotally connected by the shaft 47.

Figures 8 and 9 disclose a plurality of suspension units of the type hereinbefore described mounted upon a vehicle of the half-track type. Cross arms 48 are secured to the frame of the vehicle and the shafts 49 and 50 of the suspension units are journalled respectively in the centers and in the opposite ends of the cross arms 48.

The construction shown in Figures 10 and 11 embodies suspension units of the type described having their respective shafts 51 and 52 journalled in the extremities of the cross arms 53, which in turn are pivotally connected at 54 to the arms 55 depending from the frame of the vehicle.

Figures 12, 13 and 14 show a modification that eliminates lateral or axial flexing of the volute springs. The arms 31 and 32 are hingedly fastened together at 35 in substantially the manner previously set forth, and the arm 31 is formed with a pair of spring housings 36. The arm 32, however, is formed with an appropriate number of upwardly extending fingers 37 near the articulation 35 for the purpose of supporting alined shafts 38 carrying spaced rollers 39. The rollers are preferably made of hardened steel and are grouped in two sets, each set being engaged by a spring seating plate 40 facing the open end of the corresponding housing 36. Each such housing receives the larger end of a volute spring 41 of the character previously described, the smaller end of the spring being mounted on a pilot stud 42 extending from the plate 40.

The smaller and larger ends of each volute are at unequal distances from the center of articulation. In the spreading or contraction of the suspension, the larger end may be assumed to remain stationary while the smaller end is swung through the arc generated by the attached cross pin 20 of Figure 1. This motion results in lateral or axial flexing of the spring in the vertical plane, although the swivel mounting of the seat 21 on the pin 20 and the clearance of the studs 23 within the springs permit some relative displacement before flexing actually occurs. However in the structure shown in Figures 12, 13 and 14, the relative displacement between the housing 36 and the fingers 37 is taken up by the rolling movement of the rollers 39 on the plate 40, so that there is no force to produce axial flexing of the spring.

While specific embodiments of the invention have been shown and been described, it will be understood that various alterations may be made without departure from the spirit of the invention as indicated by the appended claims.

What I claim is:

1. A vehicle spring construction for a bogie comprising a pair of arms pivotally related to each other, transverse wheel axles extending therefrom, spring seats associated respectively with said arms, the free ends of said arms being normally horizontally alined, and a volute spring inserted between said seats and having its axis disposed at an acute angle to a line joining said free ends, the plane of movement of said axles being transverse to the plane of the wheel axles.

2. A vehicle spring comprising a pair of arms pivotally related to each other, transverse wheel axles extending therefrom, spring seats associated respectively with said arms, one of said seats being fixed to its arm, the free ends of said arms being normally horizontally alined, and a volute spring inserted between said seats and having its axis disposed at an acute angle to a line joining said free ends.

3. A vehicle spring comprising a pair of arms pivotally related to each other, transverse wheel axles extending therefrom, spring seats associated respectively with said arms, the free ends of said arms being normally horizontally alined, and a volute spring inserted between said seats and having its axis disposed at an acute angle to a line joining said free ends, one of said seats being fixed to its arm and the other seat being displaceable relatively to its arm in the plane of articulation.

4. A vehicle suspension comprising a pair of arms articulated together on a common axis, spring seats associated respectively with said arms, the free ends of said arms being normally horizontally alined, and a volute spring inserted between said seats and having its axis disposed at an acute angle to a line joining said free ends.

5. A vehicle suspension comprising a pair of arms articulated together on a common axis and each adapted to hold a wheel axle on its free end, spring seats associated respectively with said arms, the free ends of said arms being normally horizontally aligned and a resilient biasing member inserted between said seats and having its axis disposed at an acute angle to a line joining said free ends, one of said seats being fixed to its arm.

HARRY A. KNOX.

REFERENCES CITED

The following references are of record in the file of this patent:

UNITED STATES PATENTS

| Number | Name | Date |
|---|---|---|
| 928,242 | Bollbach et al. | July 20, 1909 |
| 2,100,689 | Dubonnet | Nov. 30, 1937 |
| 2,322,785 | Knox | June 29, 1943 |
| 2,323,204 | Cross | June 29, 1943 |
| 2,355,456 | Macbeth | Aug. 8, 1944 |
| 1,539,272 | Prescott | May 26, 1925 |
| 2,323,919 | Knox | July 13, 1943 |

FOREIGN PATENTS

| Number | Country | Date |
|---|---|---|
| 475,625 | Great Britain | Nov. 23, 1937 |
| 244,573 | Italy | Feb. 4, 1926 |
| 483,386 | Germany | Sept. 28, 1929 |
| 367,009 | Italy | June 13, 1939 |